United States Patent [19]

Larson et al.

[11] Patent Number: 4,970,896

[45] Date of Patent: Nov. 20, 1990

[54] FLOAT ACTIVATED GAUGE

[75] Inventors: Robert M. Larson, Mequon; James E. Blomquist, Grafton, both of Wis.

[73] Assignee: The Kelch Corporation, Cedarburg, Wis.

[21] Appl. No.: 408,832

[22] Filed: Sep. 18, 1989

[51] Int. Cl.$^5$ .............................................. G01F 23/48
[52] U.S. Cl. ..................................... 73/320; 116/228
[58] Field of Search ................... 73/319, 320; 116/228; 340/624

[56] References Cited

U.S. PATENT DOCUMENTS

| 1,101,409 | 6/1914 | Condit | 73/320 |
| 1,225,108 | 5/1917 | Carton | 73/320 |
| 1,371,395 | 3/1921 | Rast | 116/228 |
| 4,724,706 | 2/1988 | Stiever | 73/320 |

FOREIGN PATENT DOCUMENTS

| 93958 | 8/1923 | Fed. Rep. of Germany | 73/320 |
| 9724 | of 1903 | United Kingdom | 73/320 |
| 9679 | of 1906 | United Kingdom | 73/320 |

Primary Examiner—William A. Cuchlinski, Jr.
Assistant Examiner—W. Morris Worth
Attorney, Agent, or Firm—Quarles & Brady

[57] ABSTRACT

A float activated gauge includes a float, a frame for guiding the vertical movement of the float, and a twisted metal strip coacting with the float to provide a visual indication of the vertical position of the float. The frame is held in position by an easily assembled head comprising a ring body and a cap. The frame comprises two vertical rods, each of which terminates on its upper end in an outwardly extending stub. When assembled, the rods and stubs of the frame are sandwiched between the cap and the ring body, so that assembly of the gauge does not require bending or deforming of the frame.

3 Claims, 1 Drawing Sheet

FLOAT ACTIVATED GAUGE

Background of the Invention

A. Field Of The Invention

The invention relates to float activated gauges of the type which comprise a frame for restraining lateral and rotational movement of a float, while at the same time allowing vertical movement of the float in response to the level of liquid in a tank. It appears best suited for use with fuel/oil tanks used with lawn mowers, snow blowers and the like.

B. Description Of The Art

One type of construction for a prior art fuel tank gauge is depicted in U.S. Pat. No. 4,724,706. This patent shows a gauge which includes an upper horizontal metal support plate, attached to two vertical guide rods upon which the float for the gauge rides. In order to position the float in place, the guide rods must be separately manufactured from the support plate and then welded together. One disadvantage of such a construction is that the welding operation is a fairly expensive manufacturing step.

Further, the weld point provides a natural point for rust to form. Thus, special rust protection steps or quality control steps may be required with this construction. Some gauge constructions are known which avoid the need for welding the rods to the head. In these latter constructions, the vertical rods include an upper stub, bent radially inwardly at a 90° angle. The head then includes horizontal holes to receive the stubs. Unfortunately, to assemble these gauges, the vertical rods must be bent outwardly under tension to allow the stubs to reach these holes. When the stubs are positioned adjacent to their corresponding holes, the tension on the frame can be released, allowing the stubs and rods to register. A sleeve is then placed over the head to retain the rods in place.

Even though welding is avoided, the assembly of a gauge according to the above described construction on a high volume assembly line is somewhat complicated in that the rods must be deformed to allow insertion of the stubs in the mating holes in the heads, while at the same time trying to align the stubs both horizontally and vertically with the holes. This requires a fair amount of dexterity and can lead to scratching of the area around the holes. In addition deformation of the frame can in some instances be detrimental. For example, very short gauges (e.g. for shallow tanks) may require proportionately large deformation of the frame, in which case the frame may not restore to the original position, i.e. be permanently bent, or may break, particularly if formed of plastic or other brittle material.

Summary Of The Invention

A float activated gauge includes the basic elements of a float movable in a vertical direction, indicating means coacting with the float for providing a visual indication of the vertical position of the float, and a frame adapted to restrict lateral movement of the float while guiding vertical movement of the float. The frame includes at least one vertical frame member and a stub member attached to the upper end of the vertical frame member. The stub member extends from the end of the vertical frame member radially outward with respect to the vertical frame member. In a preferred form, the stub can form an "L-shaped" ear on the end of the vertical frame member.

The gauge also includes a body member having a hollow central portion with a side lobe extending from an interior wall of the body member into the hollow central portion. The side lobe includes a well formed on the top of the side lobe adapted to receive the stub formed on the vertical frame member and to restrain downward and lateral movement of the stub member. The gauge also has a cap that can be positioned over the well and stub to restrain upward movement of the stub member. In a preferred form, the cap has a lower cylindrical section formed with a vertical side alignment channel having an outer portion for slidably receiving the side lobe of the main body member and an inner portion for receiving the vertical frame member. The inner portion is formed parallel to and in communication with the outer portion, wherein upon assembly of the gauge the presence of the side lobe of the body in the outer portion retains the vertical frame member in the inner portion.

There is also a top section of the cap which is attached to the top of the lower cylindrical section, and covers the top of the vertical side alignment channel such that when the gauge is assembled, the top section restricts upward movement of the stub member.

The frame may include two such vertical frame members, each including a stub member directed outwardly away from the other vertical frame member. In that case, the lower cylindrical section has two corresponding vertical side channels, each adapted to receive one of the vertical frame members, and the body includes two side lobes, each side lobe including a well.

The float is preferably small enough to pass through the hollow central portion of the body member. The gauge may thereby be assembled by first forming a sub-assembly comprised of the float, the indicating means, the frame, the stub member and the cap, and then inserting the sub-assembly through the hollow central portion of the body member.

One important advantage of the present invention is the simplicity of assembly afforded thereby. By having the stubs directed outwardly, the frame may be slid straight onto the cap, without bending or deforming the frame. Because the float and the rest of the cap/frame sub-assembly is sized to fit through the hollow central portion of the body, the cap/frame sub-assembly may then be simply slid straight into the body. The entire assembly may therefore be performed with a minimum of dexterity, and without putting any of the parts under tension.

The foregoing and other objects and advantages of the invention will appear from the following description. In the description, reference is made to the accompanying drawings which form a part hereof, and in which there is shown by way of illustration a preferred embodiment of the invention. Such embodiment does not represent the full scope of the invention, however. Reference therefore should be made to the claims herein for interpreting the scope of the invention.

Description Of The Preferred Embodiment

Figure 1:
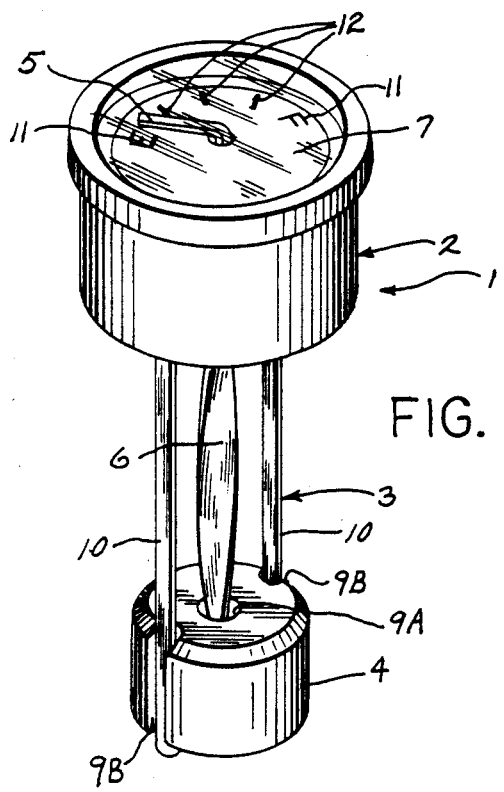
FIG. 1 is a perspective view of a preferred form of a float activated gauge according to the present invention.
Figure 2:
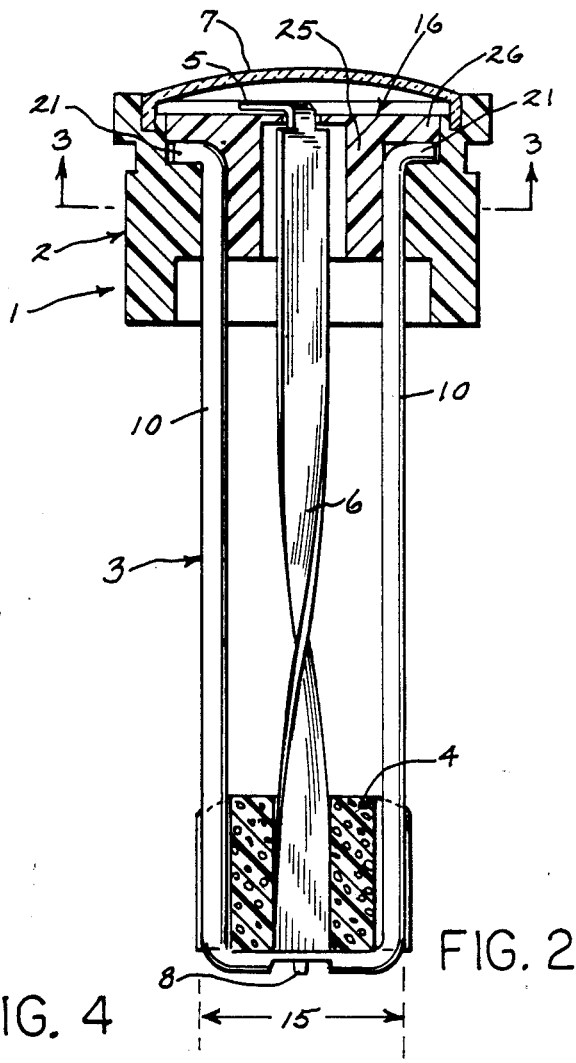
FIG. 2 is a vertical sectional view of the float activated gauge of FIG. 1.

Referring to FIGS. 1 and 2, a float activated gauge 1 according to the present invention includes a body 2, a cap 16, frame 3 for slidably guiding a float 4, and an indicating needle 5 formed on the end of a twisted metal strip 6. The body 2 is mounted on a tank (not shown) by any known means, either permanently or removably, for example, using threads (not shown). The cap 16 is disposed in a hollow central portion 17 of the body 2, and a novel coaction of structural features on the body 2 and cap 16 is used to support and retain the frame 3. The frame 3 extends into the tank, and the float 4 then responds to changing levels of liquid in the tank.

The float 4, the needle 5 and the twisted metal strip 6 operate in the customary manner to indicate the level of liquid in the tank. One end of the twisted metal strip 6 includes a tab 7 rotatably received in a hole in the bottom of frame 3. The other end of the twisted metal strip 6 terminates in needle 5, which extends through a hole in the top of cap 16 to allow external viewing, and then is bent at a 90° angle. A clear bezel 7 is provided to seal the gauge 1 against the entrance of contaminants while permitting observation of the position of the needle 5.

The float 4 is formed with a bottom rectangular slot (not shown) which extends down from circular recess 9A. The rectangular slot conforms to the cross-sectional shape of the twisted metal strip 6 in the usual manner. The float 4 further includes vertical slots 9B guided by opposite side rods 10 of the frame 3 allows the float 4 to move vertically, but not to rotate.

As the float 4 moves vertically in response to changing levels of liquid in the tank, the twisted metal strip 6 is forced to rotate. The needle 5 provides a visual indication of the degree of rotation of the strip 6, which is of course directly related to the level of liquid in the tank. Indicia 11 are provided on the cap 16 underneath the needle 5, such as "E" for "empty", "F" for "full", and graduation marks 12 for intermediate positions therebetween.

The present invention is primarily concerned with the attachment of the frame 3 to body 2 and cap 16 in a manner which provides ease of assembly.

Figure 4:
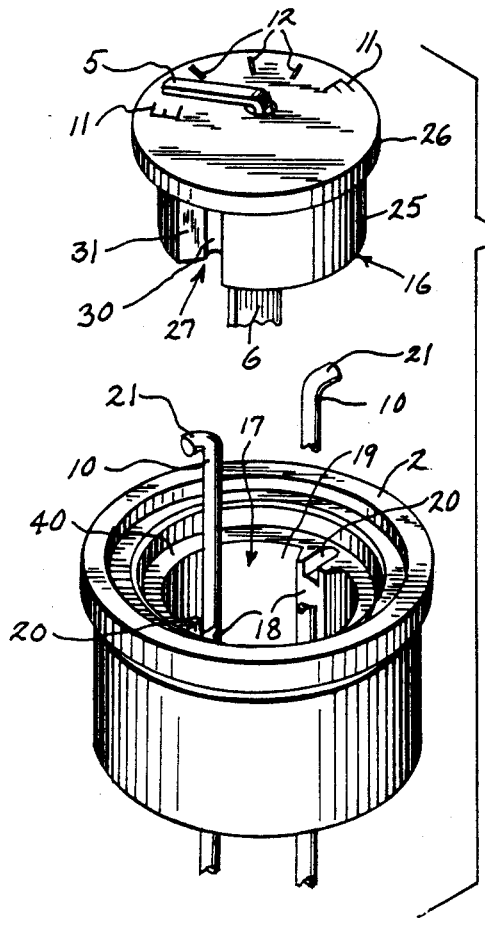
FIG. 4 is an exploded perspective view of the gauge of FIG. 1.
Figure 3:
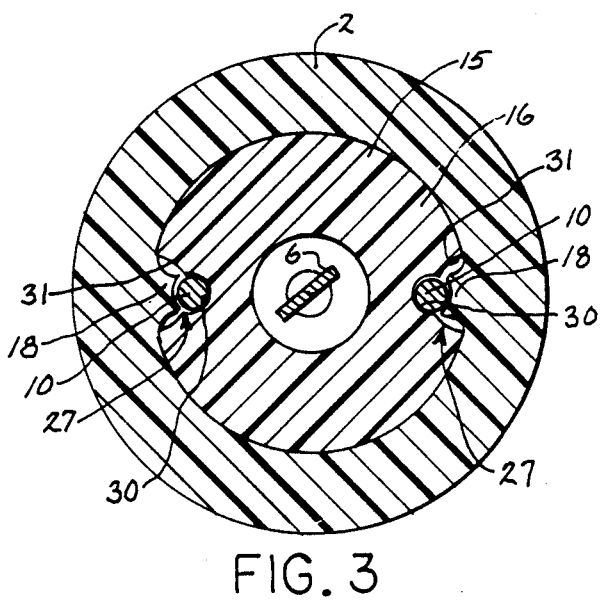
FIG. 3 is a horizontal sectional view taken on line 3—3 of FIG. 2.

Referring to FIGS. 2-4, body 2 is generally cylindrical, with a hollow central portion 17 which is mated to receive the cap 16. The body 2 includes two side lobes 18 which protrude into the hollow central portion 17 from an inner wall 19 of the body 2. The lobes 18 are positioned opposite each other, i.e. 180° apart, and protrude into the hollow central portion 17 to a depth such that the distance between the respective vertical faces of the lobes 18 corresponds to the width 15 of the frame 3. On the upper, or top surface of each lobe 18, a well 20 is formed to receive an outwardly bent stub 21 formed on the end of each frame side rod 10. The frame 3 may thereby be positioned between the lobes 18, with the stubs 21 nested in the corresponding wells 20.

The cap 16 comprises a generally cylindrical lower alignment section 25 and a top indicator/retainer wall section 6. Two vertical side channels 27 are formed in the lower section 25, positioned 180° apart on the lower section 25 to correspond to the lobes 18 on the body 2. Referring primarily to FIG. 3, each vertical side channel 27 includes a small vertical inner channel 30 adapted to receive one of the frame side rods 10, and a larger outer channel 31 adapted to slidably receive one of the lobes 18.

From the forgoing description, it should now be clear that the coaction of the lobes 18 with the vertical side channels 27 serves two important functions. First, the outer channel 31 acts as a guide for assembling the cap 16 and the body 2 together, and for restricting relative rotation thereof once assembled. Secondly, the frame side rods 10 are held in the inner channel 30 by the lobes 18, thereby holding the rods 10 in the desired vertical position.

It should also be apparent that other constructions for the vertical side channels 27 may be employed. For example, the vertical side channels 27 may be roughly triangular in cross-section, with the lobes 18 having a mating trapezoidal shape. In that case, the distinction between the inner and outer channels 30 and 31 would merely be their respective positions in the triangular cross-section, instead of an identifiable physical boundary. In any event, the basic concept is that each rod 10 is retained on the inner portion of the vertical side channel 27 by one of the lobes 18, while at the same time, the lobe 18 serves as a guide for the channel 27.

Referring again to FIGS. 2 and 4, the simplicity of assembly for the gauge 1 will now be described. The float 4 and twisted metal strip 6 are first positioned on the frame 3. Then the upper side rods 10 and stubs 21 of the frame 3 are inserted in and on vertical side channels 27. At this time the needle 5 is straight in line with the axis of the twisted metal strip 6, e.g. prior to being bent over 90°, so that the needle 5 passes straight through the hole in the top of the cap 16. Thereafter, the needle 5 is bent to its horizontal position.

The channels 27 are arranged such that the distance between the inner channels 30 corresponds to the distance between the rods 10, so that the operation of assembling the frame 3 to the cap 16 is performed without bending or deforming the frame 3 in any way. The assembly of the rods 10 to the cap 16 is therefore simplified over prior assemblies of this type in which the frame must be deformed to allow inwardly facing stubs to clear the main section of a frame support member. Insertion of the rods 10 into cap 16 is continued until the stubs 21 abut against the top section 26 of the cap 16. At that point, the top section 16 restricts any further upward vertical movement of the rods 10.

Another important aspect of this invention is that the float 4 is made small enough in diameter so that the float 4 passes freely through the hollow central portion 17 of body 2. The sizing of the float 4 is important as it allows the cap/frame sub-assembly to be inserted as unit into the body 2 from above, i.e. from the top side of the body 2. If the float 4 were too big to fit through the hollow central portion 17 of body 2, then a cap/frame sub-assembly could not be inserted as a unit, and must instead be assembled in place, through the body 2 from both top and bottom simultaneously. The latter operation is clearly undesirable as it is much more complicated and may require bending of the frame 3 to accomplish.

The insertion of the cap/frame sub-assembly into the body 2 is therefore preferably accomplished by first inserting the frame 3, together with captive float 4, through the top of the body. The cap 16 portion of the cap/frame sub-assembly is then inserted by aligning the side channels 27 on the cap 16 with the lobes 18 on the body 2. As previously stated, the lobes 18 act as a guide for the channels 27 during the insertion. The body 2 also includes a ledge 40 to act as a stop for the top section 26 of the cap 16. As insertion of the cap/frame sub-assembly continues, the outwardly facing stubs 21 are received into the wells 20 on lobes 18. The wells 20 are constructed such that the depth of the wells is equal to the thickness of the stubs 21, and the top of the wells 20 is flush with the ledge 40. In that way, insertion can continue until the top section 26 of the cap 16 contacts the ledge 40, and the stubs 21 essentially simultaneously bottom in the wells 20.

The assembled gauge is best illustrated in relation to FIGS. 2 and 3. Rods 10 are restricted from vertical movement by virtue of the stubs 21 being held captive between the top section 26 and the wells 20 formed on lobes 18. Rotational/lateral movement is also restricted.

The body 2 and cap 16 are preferably both made of any known plastic material suitable for use with the fuel or other liquid with which the gauge 1 is to be used. The body 2 and cap 16 can further be secured together by any known means, including a snap fit, adhesives, or sonic welding. Finally, the bezel 7 is attached to the body 2, again according to any known method, such as those enumerated above.

It should be apparent to those skilled in the art numerous modification in addition to those specifically mentioned above are contemplated within the scope of this invention. For example, the above described exemplary embodiment depicts the frame 3 as comprising two rods 10 of circular cross section. A single arm frame, as generally known in the art, is also usable with this invention. Similarly, any arbitrary cross section for the rod or rods and the stubs is applicable. Also, although the embodiment is shown and described as being in a generally vertical position, it should be apparent that the gauge can be inclined substantially without impairing its function, so that the term "vertical" is used in a broader sense.

We claim:

1. A float activated gauge comprising:
   a float movable in a vertical direction;
   indicating means coacting with the float for providing a visual indication of the vertical position of the float;
   a frame adapted to restrict lateral movement of the float while guiding vertical movement of the float, the frame including at least one vertical frame member;
   a stub member attached to an upper end of the vertical frame member, the stub member extending from the upper end of the vertical frame member radially outward with respect to the vertical frame member;
   a body member having a hollow central portion with a side lobe extending from an interior wall of the body member into the hollow central portion, the side lobe including an upwardly facing surface, an inner facing surface, and a well formed on the upwardly facing and inner facing surfaces, the well having a top opening and being adapted to receive the stub member formed on the vertical frame member and to restrain downward and lateral movement and the stub member and
   a cap including;
   a lower cylindrical section formed with a vertical side alignment channel having an outer portion for slidably receiving the side lobe of the body member and an inner portion for receiving the vertical frame member, the inner portion being formed parallel to and in communication with the outer portion, whereby upon assembly of the gauge the presence of the side lobe of the body member in the outer portion retains the vertical frame member in the inner portion with the stub member aligned with the well; and
   a top section attached to the lower cylindrical section, the top section covering the vertical side alignment channel such that when the gauge is assembled, the top section restricts upward movement of the stub member out of the top opening of the well.

2. The gauge as recited in claim 1 in which the frame includes two vertical frame members, each including a stub member directed radically outward, the lower cylindrical section includes two vertical side alignment channels each adapted to receive one of the vertical frame members, and the body member includes two side lobes, each side lobe including a well.

3. The gauge as recited in claim 1, in which the float is small enough to pass through the hollow central portion of the body member and the gauge may thereby be assembled by first forming a sub-assembly comprised of the float, the indicating means, the frame, the stub member and the cap, and then inserting the sub-assembly through the hollow central portion of the body member.

* * * * *